United States Patent
Lorello et al.

(10) Patent No.: US 9,161,189 B2
(45) Date of Patent: Oct. 13, 2015

(54) AUTOMATIC CALL FORWARDING TO IN-VEHICLE TELEMATICS SYSTEM

(75) Inventors: Timothy J. Lorello, Gambrills, MD (US); Elliott Hamilton, Hyattsville, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 430 days.

(21) Appl. No.: 11/580,880

(22) Filed: Oct. 16, 2006

(65) Prior Publication Data

US 2007/0086579 A1    Apr. 19, 2007

Related U.S. Application Data

(60) Provisional application No. 60/727,545, filed on Oct. 18, 2005.

(51) Int. Cl.
| | |
|---|---|
| *H04M 3/42* | (2006.01) |
| *H04W 4/16* | (2009.01) |
| *H04M 3/54* | (2006.01) |
| *H04W 4/04* | (2009.01) |
| *H04W 8/28* | (2009.01) |

(52) U.S. Cl.
CPC ............ *H04W 4/16* (2013.01); *H04M 3/42263* (2013.01); *H04M 3/54* (2013.01); *H04W 4/04* (2013.01); *H04M 2203/1091* (2013.01); *H04M 2203/2094* (2013.01); *H04M 2242/30* (2013.01); *H04W 8/28* (2013.01)

(58) Field of Classification Search
USPC ........................................................ 455/445
See application file for complete search history.

(56) References Cited

U.S. PATENT DOCUMENTS

| | | | |
|---|---|---|---|
| 1,103,073 | A | 7/1914 | O'Connell |
| 4,651,156 | A | 3/1987 | Martinez |
| 4,706,275 | A | 11/1987 | Kamil |
| 4,891,638 | A | 1/1990 | Davis |

(Continued)

FOREIGN PATENT DOCUMENTS

| | | | | |
|---|---|---|---|---|
| EP | 1 111 886 | 12/1999 | | |
| KR | 20060000076 | * | 1/2006 | .............. B60R 11/02 |

(Continued)

OTHER PUBLICATIONS

International Search Report in PCT/US2006/38946, Jul. 26, 2007.

(Continued)

*Primary Examiner* — German J Viana Di Prisco
(74) *Attorney, Agent, or Firm* — William H. Bollman

(57) ABSTRACT

Cell phone calls are automatically call forwarded to an in-vehicle telematics system when a driver using the cell phone is in their vehicle. Presence of the driver may be detected, e.g., by detection of a key in the ignition and presumption that the driver is in the vehicle while the key is in the ignition. The in-vehicle telematics unit signals that its driver is present. A phone number lookup is performed, e.g., by a third party database service associating cell phone number and wireless carrier with a telematics phone number of the drivers vehicle. A call forwarding request is then made between the telematics network to the relevant wireless carrier providing service to the driver's cell phone. The correct wireless carrier network is contacted, and a call forward is established to the telematics system of the driver's vehicle. When the driver leaves the vehicle, the call forwarding is terminated.

21 Claims, 3 Drawing Sheets

(56) References Cited

U.S. PATENT DOCUMENTS

| | | |
|---|---|---|
| 4,891,650 A | 1/1990 | Sheffer |
| 4,952,928 A | 8/1990 | Carroll |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,289,527 A | 2/1994 | Tiedemann |
| 5,293,642 A | 3/1994 | Lo |
| 5,299,132 A | 3/1994 | Wortham |
| 5,325,302 A | 6/1994 | Izidon |
| 5,334,974 A | 8/1994 | Simms |
| 5,343,493 A | 8/1994 | Karimullah |
| 5,345,227 A | 9/1994 | Fascenda |
| 5,347,568 A | 9/1994 | Moody |
| 5,349,696 A | 9/1994 | Matai |
| 5,351,235 A | 9/1994 | Lahtinen |
| 5,353,328 A | 10/1994 | Jokimies |
| 5,361,212 A | 11/1994 | Class |
| 5,363,425 A | 11/1994 | Mufti |
| 5,374,936 A | 12/1994 | Feng |
| 5,379,031 A | 1/1995 | Mondrosch |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,396,558 A | 3/1995 | Ishiguro |
| 5,398,190 A | 3/1995 | Wortham |
| 5,406,614 A | 4/1995 | Hara |
| 5,408,513 A | 4/1995 | Busch |
| 5,408,519 A | 4/1995 | Pierce |
| 5,408,682 A | 4/1995 | Ranner |
| 5,412,726 A | 5/1995 | Nevoux |
| 5,418,537 A | 5/1995 | Bird |
| 5,423,076 A | 6/1995 | Westergren |
| 5,432,841 A | 7/1995 | Rimer |
| 5,434,789 A | 7/1995 | Fraker |
| 5,438,615 A | 8/1995 | Moen |
| 5,440,621 A | 8/1995 | Castro |
| 5,452,471 A | 9/1995 | Leopold |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy, Jr. |
| 5,465,401 A | 11/1995 | Thompson |
| 5,469,497 A | 11/1995 | Pierce |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,485,505 A | 1/1996 | Norman |
| 5,488,563 A | 1/1996 | Chazelle |
| 5,494,091 A | 2/1996 | Freeman |
| 5,497,149 A | 3/1996 | Fast |
| 5,502,761 A | 3/1996 | Duncan |
| 5,506,893 A | 4/1996 | Buscher |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'Esperance |
| 5,552,772 A | 9/1996 | Janky |
| 5,555,286 A | 9/1996 | Tendler |
| 5,555,446 A | 9/1996 | Jasinski |
| 5,568,119 A | 10/1996 | Schipper |
| 5,574,648 A | 11/1996 | Pilley |
| 5,579,372 A | 11/1996 | Astrom |
| 5,588,009 A | 12/1996 | Will |
| 5,590,417 A | 12/1996 | Rydbeck |
| 5,592,535 A | 1/1997 | Klotz |
| 5,596,734 A | 1/1997 | Ferra |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |
| 5,615,116 A | 3/1997 | Gudat |
| 5,621,793 A | 4/1997 | Bednarek |
| 5,628,051 A | 5/1997 | Salin |
| 5,628,600 A | 5/1997 | Pasquini |
| 5,633,912 A | 5/1997 | Tsoi |
| 5,682,600 A | 10/1997 | Salin |
| 5,687,216 A | 11/1997 | Svensson |
| 5,724,667 A | 3/1998 | Furuno |
| 5,740,534 A | 4/1998 | Ayerst |
| 5,761,618 A | 6/1998 | Lynch |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,141 A | 8/1998 | Zicker |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,822,700 A | 10/1998 | Hult |
| 5,828,740 A | 10/1998 | Khuc |
| 5,920,821 A | 7/1999 | Seazholtz |
| 5,930,701 A | 7/1999 | Skog |
| 5,943,399 A | 8/1999 | Bannister |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,966,663 A | 10/1999 | Gleason |
| 5,974,054 A | 10/1999 | Couts |
| 5,978,685 A | 11/1999 | Laiho |
| 5,987,323 A | 11/1999 | Huotari |
| 5,998,111 A | 12/1999 | Abe |
| 6,011,976 A | 1/2000 | Michaels |
| 6,014,429 A | 1/2000 | LaPorta |
| 6,035,025 A | 3/2000 | Hanson |
| 6,049,710 A | 4/2000 | Nilsson |
| 6,055,413 A | 4/2000 | Morse |
| 6,055,442 A | 4/2000 | Dietrich |
| 6,058,300 A | 5/2000 | Hanson |
| 6,064,875 A | 5/2000 | Morgan |
| 6,070,067 A | 5/2000 | Nguyen |
| 6,075,982 A | 6/2000 | Donovan |
| 6,081,508 A | 6/2000 | West |
| 6,085,099 A | 7/2000 | Rittter |
| 6,087,956 A | 7/2000 | Helferich |
| 6,101,378 A | 8/2000 | Barabash |
| 6,122,503 A | 9/2000 | Daly |
| 6,122,520 A | 9/2000 | Want |
| 6,125,281 A | 9/2000 | Wells |
| 6,128,482 A | 10/2000 | Nixon |
| 6,148,197 A | 11/2000 | Bridges |
| 6,148,198 A | 11/2000 | Anderson |
| 6,149,353 A | 11/2000 | Nilsson |
| 6,169,891 B1 | 1/2001 | Gorham |
| 6,173,181 B1 | 1/2001 | Losh |
| 6,181,935 B1 | 1/2001 | Gossman |

(56) References Cited

U.S. PATENT DOCUMENTS

| | | | |
|---|---|---|---|
| 6,188,752 B1 | 2/2001 | Lesley | |
| 6,188,911 B1 | 2/2001 | Wallentin | |
| 6,198,431 B1 | 3/2001 | Gibson | |
| 6,199,045 B1 | 3/2001 | Giniger | |
| 6,205,330 B1 | 3/2001 | Winbladh | |
| 6,208,854 B1 | 3/2001 | Roberts | |
| 6,208,870 B1 | 3/2001 | Lorello | |
| 6,223,046 B1 | 4/2001 | Hamill-Keays | |
| 6,226,529 B1 | 5/2001 | Bruno | |
| 6,249,680 B1 | 6/2001 | Wax | |
| 6,249,744 B1 | 6/2001 | Morita | |
| 6,263,212 B1 | 7/2001 | Ross | |
| 6,266,614 B1 | 7/2001 | Alumbaugh | |
| 6,289,373 B1 | 9/2001 | Dezonno | |
| 6,292,669 B1 | 9/2001 | Meuronen | |
| 6,317,594 B1 | 11/2001 | Gossman | |
| 6,327,479 B1 | 12/2001 | Mikkola | |
| 6,373,930 B1 | 4/2002 | McConnell et al. | |
| 6,529,722 B1 | 3/2003 | Heinrich | |
| 6,744,858 B1* | 6/2004 | Ryan et al. | 379/45 |
| 6,744,859 B1 | 6/2004 | Koepke et al. | |
| 6,751,463 B1 | 6/2004 | Lorello | |
| 6,771,742 B2 | 8/2004 | McCalmont et al. | |
| 6,771,946 B1* | 8/2004 | Oyaski | 455/345 |
| 6,775,356 B2 | 8/2004 | Salvucci et al. | |
| 6,888,927 B1 | 5/2005 | Cruickshank | |
| 6,922,565 B2 | 7/2005 | Rhodes et al. | |
| 7,054,659 B2 | 5/2006 | Gioscia | |
| 7,142,580 B1 | 11/2006 | Balachandran | |
| 7,171,207 B2 | 1/2007 | Artola | |
| 7,450,935 B1* | 11/2008 | Link et al. | 455/417 |
| 7,590,426 B2 | 9/2009 | Cho | |
| 7,603,148 B2 | 10/2009 | Michalak | |
| 7,693,511 B2* | 4/2010 | Bottrich et al. | 455/417 |
| 7,693,546 B1 | 4/2010 | Gioscia | |
| 8,055,271 B2 | 11/2011 | Nair | |
| 8,265,326 B2 | 9/2012 | Singh | |
| 8,271,188 B2 | 9/2012 | De Koning | |
| 8,284,980 B2 | 10/2012 | Parker | |
| 2002/0003345 A1* | 1/2002 | Stanley et al. | 280/735 |
| 2002/0181681 A1 | 12/2002 | Mani | |
| 2003/0003900 A1* | 1/2003 | Goss et al. | 455/417 |
| 2003/0092451 A1 | 5/2003 | Holloway | |
| 2003/0122669 A1* | 7/2003 | Filippov et al. | 340/563 |
| 2003/0125085 A1 | 7/2003 | Collins | |
| 2003/0224840 A1* | 12/2003 | Frank et al. | 455/575.9 |
| 2004/0072558 A1* | 4/2004 | Van Bosch | 455/417 |
| 2004/0158371 A1* | 8/2004 | Iggulden et al. | 701/29 |
| 2004/0185854 A1 | 9/2004 | Artola | |
| 2004/0190497 A1 | 9/2004 | Knox | |
| 2004/0198332 A1* | 10/2004 | Lundsgaard | 455/417 |
| 2004/0203692 A1* | 10/2004 | Schwinke et al. | 455/419 |
| 2004/0203728 A1* | 10/2004 | Schwinke et al. | 455/425 |
| 2005/0009576 A1* | 1/2005 | Van Bosch | 455/569.2 |
| 2005/0054335 A1 | 3/2005 | Pearson | |
| 2005/0080519 A1* | 4/2005 | Oesterling et al. | 701/1 |
| 2005/0090236 A1* | 4/2005 | Schwinke et al. | 455/415 |
| 2005/0105510 A1* | 5/2005 | Reding et al. | 370/352 |
| 2005/0107132 A1* | 5/2005 | Kamdar et al. | 455/569.2 |
| 2005/0169249 A1 | 8/2005 | Shirota | |
| 2005/0201357 A1* | 9/2005 | Poyhonen | 370/352 |
| 2005/0260994 A1* | 11/2005 | Losch | 455/445 |
| 2005/0265536 A1 | 12/2005 | Smith | |
| 2006/0007920 A1* | 1/2006 | Michel et al. | 370/352 |
| 2006/0092023 A1* | 5/2006 | Hofbeck et al. | 340/561 |
| 2007/0191013 A1 | 8/2007 | Gunnarsson | |
| 2008/0189028 A1 | 8/2008 | Nair | |
| 2008/0200182 A1 | 8/2008 | Shim | |
| 2010/0093358 A1 | 4/2010 | Cheong | |
| 2010/0216426 A1 | 8/2010 | Karim | |
| 2010/0330903 A1 | 12/2010 | Chabrerie | |
| 2011/0038326 A1 | 2/2011 | Davies | |
| 2011/0219226 A1 | 9/2011 | Olsson | |

FOREIGN PATENT DOCUMENTS

| | | |
|---|---|---|
| SE | WO2010/005363 | 1/2010 |
| WO | WO 02/23933 | 3/2002 |

OTHER PUBLICATIONS

European Search Report in European Patent Appl. No. 06825958.9 dated Sep. 20, 2010.

International Search Report in PCT/US2011/000817 dated Sep. 12, 2011.

The Power of Mobile Unified Messaging: Siemans and Comverse to Demonstrate WAP-Based Messaging Applications on Live GPRS System, Comverse, Feb. 2000.

ETSI/3Gpp, 3$^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.

ETSI,3GPP, 3$^{rd}$ Generation Partnership Project; Technical Specification Group Core Network; Customized Applications for Mobile network Enhanced Logic; (CAMEL) Phase 3—Stage 2 (3G TS 23.078 version 3.3.0), 12/199, pp. 300-329.

Bond, "Cellular Carriers Use Prepaid Programs to Reach Untapped Markets," Billing World, Mar. 1997, pp. 14-17.

Freedom Wireless, "The Freedom to Chose! Get Pre-Pay Cellular," sales pamphlet, undated.

MultiMedia Publishing Corp., "Prepaid Cellular and Prepaid Wireless Market Report and Forecast 1997-2002," sales literature, undated.

NEXTLINK, "Introducing a New Prepaid Telephone Service from NEXTLINK," sales literature, undated.

Open Development Corp., "openMedia Cellular Prepaid," sales literature, undated.

Tecore, Inc., "Pre-Paid Cellular," sales literature, Mar. 25, 1997, pp. 1-4.

* cited by examiner

AUTOMATIC CALL FORWARDING TO IN-VEHICLE TELEMATICS SYSTEM

The present invention claims priority from U.S. Provisional Application No. 60/727,545 to Timothy J. Lorello, entitled "Automatic Call Forwarding in In-Vehicle Telematics System" filed Oct. 18, 2005, the entirety of which is expressly incorporated herein by reference.

BACKGROUND OF THE INVENTION

1. Field of the Invention

This invention relates to wireless telecommunications. In particular, it relates to automobile telematics systems with wireless telecommunications.

2. Background of the Related Art

The word "telematics", in its broadest sense, relates to the combination of computers and wireless telecommunications technologies. More recently, the term "telematics" has evolved to refer to automobile systems that combine global positioning satellite (GPS) tracking and other wireless communications for automatic roadside assistance and remote diagnostics. General Motors Corp. first popularized automotive telematics with its OnStar™ system. The use of the word "telematics" throughout the current specification is intended to refer to the later definition of more recent recognition, i.e., to mean automotive telematics.

Many new vehicles are equipped with wireless-based telematics units providing services controlled by voice commands. One successful telematics system is available from OnStar Corp. (www.onstar.com), another from Mercedes-Benz called TeleAid™. According to OnStar, OnStar brings together emergency service providers, wireless telephone, and satellite technologies to help protect a driver, and keep them connected on the road.

As part of the telematics system, a telematics unit including a cellular circuit is located within the vehicle, and powered by the vehicle's battery. Telematics units were originally analog-only, but have migrated to analog/digital-ready, and finally to dual-mode analog/digital. Dual-mode analog/digital telematics units operate on both the analog and digital wireless networks.

With a suitable subscription to use of a telematics operations center such as OnStar™, TeleAid™, etc., a driver or passenger in a vehicle including a telematics unit has access to a calling feature in their vehicle (sometimes voice-activated), just in case their hand-held cell phone is lost, forgotten, has a low battery, has difficulty with its antenna inside the vehicle, etc. The driver can pre-purchase OnStar Hands-Free Calling minutes to use on the road. Such packages are typically billed to a credit card they keep on file with OnStar. They can order minutes packages by pushing the phone or white-dot button at any time. (TeleAid systems use an 'information' pushbutton.)

Conventional telematics units are also capable of providing location information to a requesting wireless network, using a Global Positioning Satellite (GPS) mounted in the vehicle, or using other location technology within the wireless network. When a vehicle occupant pushes a given button in the vehicle, essentially calling the telematics operations center, the telematics operations center identifies the vehicle's location via information provided over the wireless data modem of the telematics system. In the event of an emergency, e.g., as indicated by deployment of an air bag, the telematics system can initiate a call to the telematics network to report such deployment, as well as the location of the vehicle. So it's only when the button is pushed to contact the telematics operations center, or when the telematics operations center is responding to an emergency signal, that the telematics operations center is provided with a location of the vehicle.

A cell phone is not required by a 3-button telematics unit such as the system available from OnStar, as vehicles so-equipped include their own wireless network circuitry. Nevertheless, most people now have a hand-held cell phone with them at all times. However, as statistics are confirming, cell phone use in vehicles can cause distractions to certain drivers, and as a result many states are requiring hands-free use of any cell phone by a driver.

Telematics systems offer hands-free calling, thus muting safety concerns with respect to cellular use by the driver of a vehicle. For instance, OnStar offers hands-free calling with a required hands-free calling-enabled vehicle, existing OnStar service contract, PrePaid minute package or enrollment in OnStar Shared Minutes Plan. OnStar voice recognition is provided to further enhance the hands-free experience. Moreover, most telematics systems have the ability to enhance the telephone call experience by automatically muting the radio, CD, navigation system or other audio source when a call is active.

To receive a call to a cell phone while driving, in many states the driver must by law have a hands-free option to their cell phone. While many cell phones include hands-free options, such options have not fully been adopted by the general population. For instance, while many cell phones include a speakerphone option with voice recognition commands that provides capabilities to operate the cell phone without handling it, many users nevertheless hold the phone while speaking into it, albeit from a distance from the microphone in speakerphone mode. Moreover, even with hands-free use, separate cell phones don't automatically mute audio sources within the vehicle during an active call. Rather, the driver must manually turn down the volume of audio sources such as a radio, CD player, iPod, etc. after the call is made, providing even more distraction to the driver.

Bluetooth technology is one new technology that is being installed in cellular phones and in wireless handsets, and provides one possible method for a hand-held cell phone to utilize hands-free calling features. FIG. 3 shows a technique of providing hands-free operation of a cell phone either using a BLUETOOTH™ piconet connection between a cell phone and a wireless headset, or using an in-vehicle telematics unit.

In particular, FIG. 3 shows a Bluetooth-enabled cell phone 402 communicating over an established piconet with a hands-free headset 402a worn by a user. Typically, in vehicle installations, the cell phone 402 is mounted into a cradle that integrates operation of the cell phone into the radio system of the car 420. Alternatively, instead of a headset 402a, a second microphone may be mounted in the car (aside from one used by the telematics unit 404), and audio may be integrated into the radio of the car for use as a speakerphone.

Another conventional way of having hands-free wireless phone operation in a vehicle is to use the in-vehicle telematics unit 404 integrated within a vehicle 420. The in-vehicle telematics unit 404 has a telematics cellular front end 406 to enable cellular communications with a relevant telematics network 410 servicing the telematics cellular front end 406.

Thus, for outgoing calls, drivers are given a choice of whether to use their cell phone 402, either via a Bluetooth headset 402a or by speakerphone; or to use their telematics system. For incoming calls, drivers have fewer options as they must answer the incoming call on the system over which the call arrives, telematics 404 or cell phone 402.

There is a need to improve vehicle safety and convenience with respect to a driver's use of their hand-held cell phone when operating a vehicle, particularly with respect to calls to their hand-held cell phone while they are driving.

SUMMARY OF THE INVENTION

In accordance with the principles of the present invention, apparatus to establish transfer of incoming calls to a wireless device comprises an occupant recognition module to detect a presence of a driver within a vehicle. An automatic call forwarding module initiates a wireless sending of a call forwarding request ON command to a wireless carrier providing wireless phone service to the wireless device associated with the driver, upon the detected presence of the driver within the vehicle. The call forwarding request ON command establishes a call forwarding of future calls to a wireless device associated with the driver.

A method of establishing a call transfer in a wireless network to a wireless device in accordance with another aspect of the invention comprises detecting a presence of an occupant in a vehicle, and initiating a wireless message to be transmitted from the vehicle requesting transfer of all future calls to a given wireless device associated with the driver to another wireless device associated with the occupant.

DETAILED DESCRIPTION OF ILLUSTRATIVE EMBODIMENTS

Figure 1:
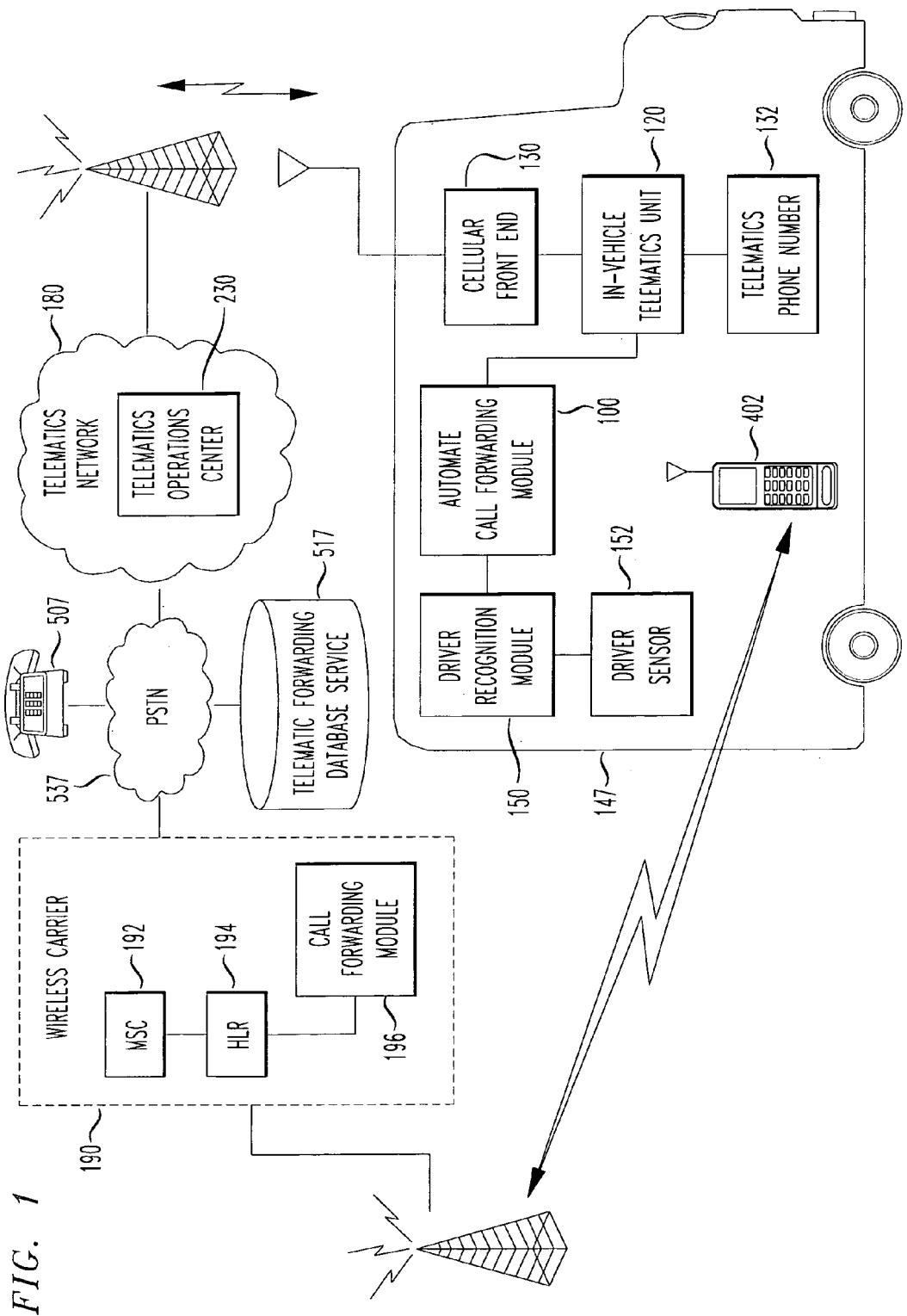
FIG. 1 shows a vehicle including an automatic call forwarding module and driver recognition module, allowing automatic call forwarding of received cell phone calls to a driver's hand-held cell phone, in accordance with the principles of the present invention.

Cell phone calls are automatically call forwarded to an in-vehicle telematics system when a driver assigned to the cell phone is in their vehicle. Presence of the driver may be detected, e.g., by detection of a key in the ignition and presumption that the driver is in the vehicle while the key is in the ignition, or presumed, e.g., when short range communications are established between the car and the driver's cell phone, e.g., via Bluetooth™. An in-vehicle telematics unit signals to its wireless telematics network that its driver is present.

A lookup of the relevant wireless carrier for the driver's cell phone is made, e.g., by a third-party service (though it could be located within the telematics network) providing a database associating the driver's telematics phone number to a handset based cellular number of their cell phone, as well as the applicable wireless carrier providing service to that handset.

A call forwarding request is then made between the telematics operations center in the telematics network to the correct wireless carrier providing service to the driver's cell phone (determined from the database lookup). The call forwarding request preferably includes a phone number to be used to access the driver's telematics unit. Such telematics phone number may be statically assigned to the driver's telematics unit, or may be dynamically assigned by the telematics network as necessary in response to a call forwarding request and released after the call forwarding is broken down.

All calls received by the wireless carrier intended for the drivers handset wireless phone are then call forwarded instead to the driver's telematics system as long as the driver is detected or presumed to be in the vehicle. Once the driver is sensed to have exited the vehicle (e.g., by removal of their assigned ignition key, or by dropout of short range communication with the driver's phone), the telematics unit in the vehicle sends a termination request for the call forwarding previously established, which is passed on to their telematics network, who passes it on to the correct wireless carrier. In this way, when the driver leaves the vehicle, the call forwarding is terminated.

Thus, the present invention provides automatic call forwarding of a cellular user's calls to an in-vehicle telematics system. Signaling from the in-vehicle telematics unit to their wireless telematics network is initiated indicating that a driver having an account with a given cell phone number is present in the vehicle. In one disclosed embodiment, this preferably occurs whether or not the driver has the relevant cell phone on their person, e.g., by ignition key detection, thus no communication with the handset phone is required. In another embodiment, the handset (rather than the driver) is communicated with to presume the presence of the driver in the vehicle. Any suitable wireless communication may suffice, e.g., BLUETOOTH, between the handset phone and the driver's telematics unit or other vehicle based short range communication system.

A call forwarding request is then made between the telematics operations center in the telematics network to the relevant wireless carrier providing service to the driver's cell phone. The request for call forwarding (and a request to later terminate the same call forwarding) sent by the telematics network is preferably sent over the public switched telephone network (PSTN) using signaling system No. 7 (SS7) signaling, IP based messaging, session initiation protocol (SIP), tone frequency signaling (MF), etc.

The wireless carrier network then establishes a call forward to the telematics system of the driver's vehicle for any/all telephone calls made to the driver's cell phone. Preferably, this call forwarding is automatically broken down when the driver is sensed to have left the vehicle, e.g., by removal of the ignition key, by loss of an established Bluetooth or other wireless connection between the driver's cell phone and a Bluetooth system in the vehicle, etc.

In disclosed embodiments, automatic call forwarding is initiated by detection of the presence of a driver within the vehicle. Presence of the driver may be detected, e.g., by detection of a key in the ignition and presumption that the driver is in the vehicle while the key is in the ignition. An alternative detection of the presence of a driver may include communication with the handset phone, e.g., upon establishment of a piconet connection (e.g. BLUETOOTH™) with the in-vehicle telematics unit and the driver's cell phone both having a presence on the network.

Detection of an operating condition of the vehicle may also be required before call forwarding is requested. For instance, detection of the vehicle in an operating condition, engine running, etc. may be required, along with the presence of the driver, before the call forwarding request is sent by the telematics unit.

FIG. 1 shows a vehicle including an automatic call forwarding module and driver recognition module, allowing automatic call forwarding of received cell phone calls to a driver's hand-held cell phone, in accordance with the principles of the present invention.

In particular, as shown in FIG. 1, a telematics operations center 230 is typically located at a wireless carrier network operations center (NOC) to provide automatic call forwarding for cell phones of users within a vehicle, in accordance with the principles of the present invention. While the disclosed embodiment relates to a driver of a vehicle, the invention is equally applicable to detection of a particular passenger in the vehicle.

The vehicle 147 includes an in-vehicle telematics unit 120 mounted therein. An exemplary in-vehicle telematics unit 120 is one available from OnStar™. The in-vehicle telematics unit 120 includes a telematics cellular front end 130, and a unique mobile identification number (MIN) or phone number 132.

The in-vehicle telematics unit 120 communicates in a respective wireless telematics network 180. The telematics network 180 includes a telematics operations center 230. The telematics operations center 230 handles emergency, information, and other calls from supported vehicles made to include respective in-vehicle telematics units 120.

Automatic call forwarding of a cellular user's calls is achieved by the use of an in-vehicle telematics unit 120 preferably including minimally a driver recognition module 150 (such as a key ignition detection system 152) and a vehicle-based telematics cellular system 130 that can receive and deliver telematics calls over the vehicle's audio system. A telematics operations center 230 within the telematics network 180 forwards a call forwarding ON request to a call forwarding module 196 of a home location register (HLR) 194 within the wireless carrier network 190 via SS7 network connections to a messaging services center (MSC) 192.

While the preferred embodiment provides automatic call forwarding upon detection of the driver in a vehicle, it is also possible to allow the driver to confirm acceptance of the automatic call forwarding before it is implemented. For instance, a driver may be instructed to activate a given button on the in-vehicle telematics unit (or other in-vehicle computer system mounted in the vehicle such as a navigation system) to allow automatic call forwarding to proceed. The driver may alternatively be instructed to activate a given button to not allow automatic call forwarding, lest the call forwarding will otherwise be automatically implemented. For instance, an audio prompt may be played from the in-vehicle telematics unit, and upon expiration of a given time-out such as 20 seconds after detection of a driver and the vehicle entering an operational condition (e.g., engine running), a call forwarding ON request will be transmitted from the in-vehicle telematics unit as a default.

In this way, a call from a third party telephone 507 to a handset phone 402 carried by a driver of a vehicle 147, the call is instead forwarded to the driver's telematics network 180, who then forwards the call to the in-vehicle telematics unit 120 of the vehicle 147.

Figure 2:
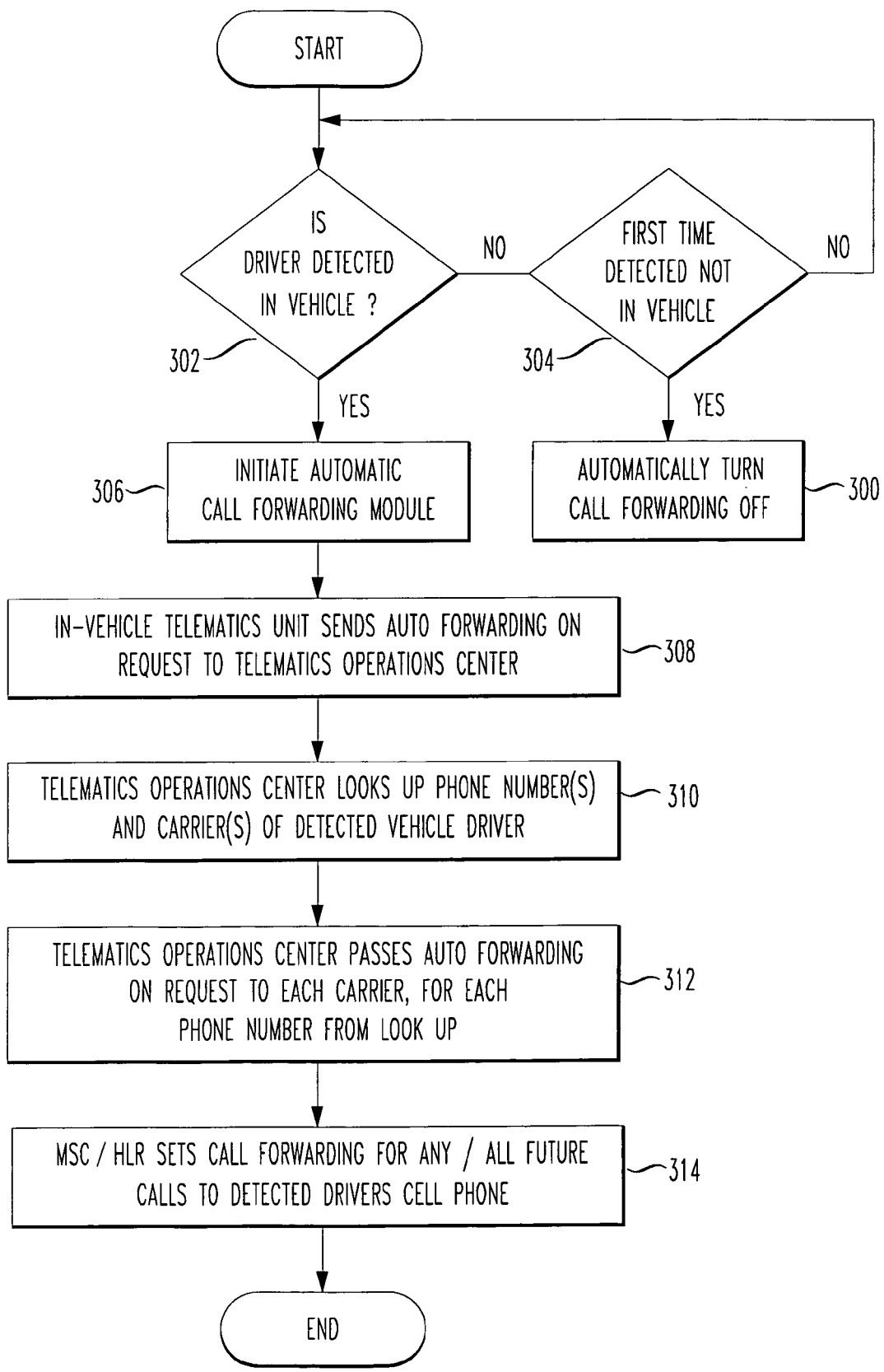
FIG. 2 shows an exemplary method of automatically initiating call forwarding of calls to a driver's cell phone to an in-vehicle telematics unit, in accordance with the principles of the present invention.
Figure 3:
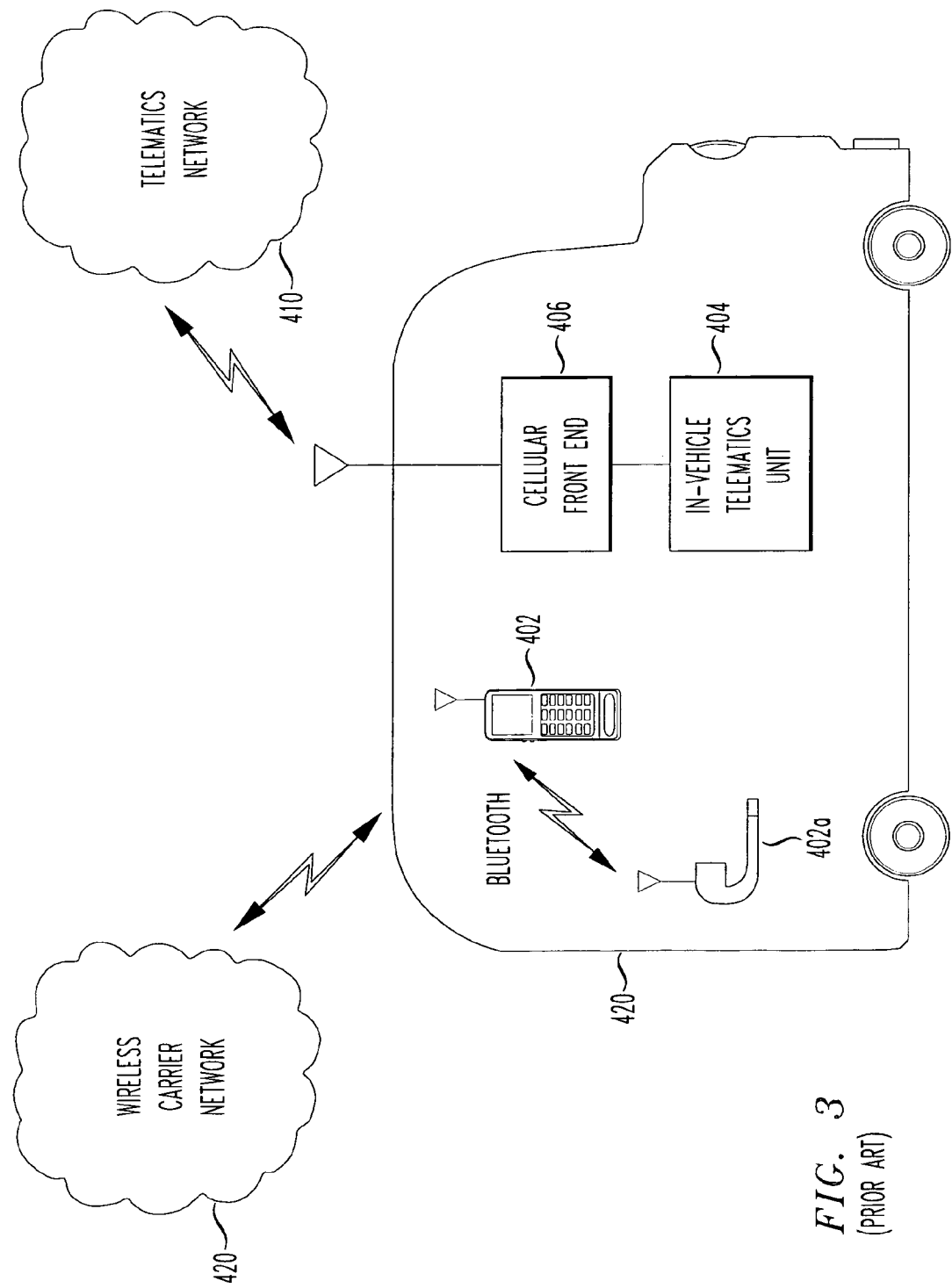
FIG. 3 shows a technique of providing hands-free operation of a cell phone either using a BLUETOOTH™ piconet connection between a cell phone and a wireless headset, or using an in-vehicle telematics unit.

FIG. 2 shows an exemplary method of automatically initiating call forwarding of calls to a driver's cell phone to an in-vehicle telematics unit, in accordance with the principles of the present invention.

In particular, as shown in step 302 of FIG. 2, driver recognition module 150 accesses relevant input to determine if the driver (or a pre-registered passenger) is in the vehicle 147. In the given embodiment, the driver is presumed to be in the vehicle if the key is in the vehicle ignition. Other detection mechanisms include a seat pressure switch indicating the presence of a person in the relevant driver or passenger seat. For simplicity of description, only detection of a driver is discussed.

The driver recognition module 150 in the vehicle detects the presence of a driver, which is sensed by the vehicle's automatic call forwarding module 100, and the car-based vehicle telematics unit 120 with cellular system of FIG. 1 (e.g., having phone number (301) yyy-yyyy) sends a message to the telematics operations center 230.

Recognition of the driver may be achieved using any suitable technique of detecting a high probability of a presence of a person in the vehicle. In the given embodiments, the driver recognition module 150 includes input from a driver sensor 152 to detect a presence of a key in the ignition of the vehicle.

Using such a system, when the cellular user/driver (or passenger) inserts their key into the relevant vehicle's ignition, the car-based driver recognition module 150 (e.g. based on the user's car key) is engaged to automatically forward an appropriate message indicating the presence of a person in the in-vehicle telematics unit 120 with telematics cellular front end 130.

Alternatively, a call forwarding instruction to a vehicle telematics system may be activated manually by the user of the cell phone by, e.g., activation of a dedicated key sequence such as "*-7-2", or dedicated pushbutton on the cell phone. In yet another implementation, the instruction may be manually initiated as the result of appropriate menu-driven software activation.

An automatic call forwarding instruction to a vehicle telematics system can be further automated by initiation upon establishment of a piconet between the driver's cell phone and their authorized in-vehicle telematics unit 120. Recognition of the driver's cell phone may be achieved by pre-entry of the cell-phone's telephone number or other unique identity information into a database accessible by the vehicle automatic call forwarding module 100.

Depending upon the particular technique used to detect the presence of a driver, if based on establishment of a BLUETOOTH™ presence between a cell phone and an in-vehicle telematics unit 120, erroneous attempts at call forwarding could possibly arise from passersby external to the vehicle. This is somewhat restricted because of the limited range of a piconet. Nevertheless, such erroneous detection of a driver may be avoided in such case by implementing authorization of any automatic call forwarding. In this way, an automatic call forwarding request is denied pursuant to a check to see if the passersby's cell phone number appears in a pre-designated list of authorized cell phones in a suitable authorized telephone number database.

Upon receipt of a message indicating that a driver is present being sent from telematics cellular front end system 130 of the in-vehicle telematics unit 120, the vehicle automatic call forwarding module 100 associates the mobile phone number of the cell phone requesting call forwarding to those mobile phone numbers pre-authorized within the pre-authorized telephone number database. Information regarding the cellular carrier associated with the cell phone may also be maintained within the pre-authorized telephone number database.

The pre-authorized telephone number database can be internal or external to the vehicle automatic call forwarding module 100, or even external to the vehicle itself. Alternatively, a third party may provide a service to maintain a pre-authorized forwarding telephone number database.

As an example, the pre-authorized telephone number database may be maintained in a subscriber database at the telematics operations center 230, or at a third-party telematics forwarding database service 517 (FIG. 1). Preferably the third-party telematics forwarding database service 517 associates a driver's telematics unit phone number with a handset wireless phone and the identity of the applicable carrier. An appropriate request for the identity of a handset phone number and carrier may be made by the telematics operations center 230.

A web site may be established to allow owners of vehicles with a vehicle telematics unit to input and/or revise the authorized cell phone number that calls are to be forwarded to. Alternatively, the telematics operations center 230 may allow operators to manually input authorized cell phone numbers on the behalf of a vehicle owner that calls in (using any telephone, or even the vehicle telematics unit 120 itself to call into the telematics operations center 230.)

In step 304, if the driver is first detected not to be in the vehicle, then the process proceeds to step 300, where any pre-established call forwarding is automatically turned OFF with an appropriate call forwarding OFF command transmitted by the in-vehicle telematics unit 120 to the telematics operations center 230, and then passed on to the relevant wireless carrier servicing the cell phone for which any pre-established call forwarding for that handset phone is to be terminated.

In step 306 of FIG. 2, if the driver is detected to be in the vehicle 147, then automatic call forwarding is initiated by the automatic call forwarding module 100.

In step 308, the in-vehicle telematics unit 120 automatically sends a call forwarding ON request to the telematics operations center 230 to cause a lookup request for the identity of a handset phone number and wireless carrier for that handset phone. With the desired phone number in hand for which call forwarding is to be established, the telematics operations center 230 passes the call forwarding ON request to the identified wireless carrier.

Preferably, the call forwarding ON request, as well as the lookup request, are transmitted using SS7 signaling, to the carrier's call forwarding module 196. The SS7 signals preferably instruct the carrier to transfer or forward any future calls received by that cell phone to the user's in-vehicle telematics unit 120, automatically, i.e., without the need for user intervention (though pre-authorization and/or call-by-call confirmation may be required to be input by the driver).

As an example, call-by-call conformation for forwarding of calls intended for the cell phone user may be provided with the presentation to the user interface of an option to permit the forwarding on a call-by-call basis. For instance, when the cell phone user's handset phone rings, the display of the handset phone may indicate two different options to accept the incoming call: a first option to answer the incoming call at the cell phone handset, and a second option to forward the incoming call to the vehicle telematics unit 120.

In step 310, the telematics operations center 230 looks up the phone number and respective wireless carrier of the detected vehicle driver (or passenger).

In step 312, the telematics operations center 230 automatically passes the call forwarding ON request to each wireless carrier for each phone number obtained from the look up performed in step 310.

In step 314, the MSC/HLF of the cell phone's wireless carrier establishes a call forwarding for any/all future calls incoming to the cell phone of the driver, until further notice.

As shown in step 300, when the driver turns off their car and takes the ignition key out of the ignition, a similar process happens as described above to forward a call forwarding TERMINATION request from the in-vehicle telematics unit 120 to their telematics operations center 230, and ultimately to the call forwarding module 196 in the wireless carrier's network 190, to turn any pre-established call forwarding OFF for all future incoming calls.

In particular, the car-based vehicle automatic call forwarding module 100 sends an appropriate 'end automatic call forwarding' type message to the in-vehicle telematics unit 120 as soon as the presence of the driver is no longer detected (e.g., when the engine has been turned off, when the ignition key has been removed, etc.)

Alternatively, the 'end automatic call forwarding' type message can be passed to the call forwarding module 196 (e.g., within the home location register (HLR) 194) upon user control from the cell phone itself. A dedicated button on the driver's cell phone (or suitable sequence of button presses) may be used to manually instruct the carrier to stop forwarding calls incoming to the cell phone to the in-vehicle telematics unit 120.

Upon receipt of the message being sent from the in-vehicle telematics unit 120, the telematics operations center 230 associates the car-based cellular number to the user's handset based cellular number and associated cellular carrier via lookup request to the telematics forwarding database service 517.

The telematics operations center 230 then sends a message over SS7 connections to the cell phone user's wireless carrier, via their mobile servicing center (MSC) 192/home location register (HLR) 194 that instructs the cell phone carrier to stop the call forwarding of any calls.

Along with a call forwarding OFF command, location of the cell phone can be reported to the wireless carrier via the in-vehicle telematics unit 120. Given the location of the cell phone, and knowing that they'd just exited their car, location based services can be provided to the user's cell phone. Exemplary services include maps of points of interest based on a personal profile stored in the home location register (HLR) 194. For instance, upon leaving the vehicle, a user can be automatically provided with a map of all nearby coffee shops based on the location of the vehicle.

The present invention has particular applicability with cellular carriers in general, and in particular auto manufacturers, and/or third party manufacturers or installers of automobile telematics systems.

While the invention has been described with reference to the exemplary embodiments thereof, those skilled in the art will be able to make various modifications to the described embodiments of the invention without departing from the true spirit and scope of the invention.

What is claimed is:

1. Apparatus to automatically force transfer of incoming calls to a wireless device, comprising:
    an ignition sensor to detect activation of a vehicle ignition; and
    an in-vehicle telematics unit to trigger initiation without user confirmation from a given wireless device within said vehicle that is not linked with an in-vehicle telematics unit, when said vehicle ignition activation is detected, of a wireless message for communication from said in-vehicle telematics unit to a telematics center, said wireless message requesting said telematics center to initiate call forwarding of all future calls intended for said wireless device within said vehicle instead be forwarded to said in-vehicle telematics unit;
    wherein said wireless message is transmitted to said telematics center by said in-vehicle telematics unit of said vehicle; and
    whereby said wireless device does not control said initiation of said call forwarding.

2. The apparatus to establish transfer of incoming calls to a wireless device according to claim 1, further comprising:
an occupant recognition module to detect an occupant when said vehicle is in an operating condition.

3. The apparatus to establish transfer of incoming calls to a wireless device according to claim 1, wherein:
said wireless device is a cell phone.

4. The apparatus to establish transfer of incoming calls to a wireless device according to claim 1, wherein:
said ignition sensor detects a presence of an occupant within said vehicle when a key associated with said occupant is inserted in said vehicle ignition.

5. The apparatus to establish transfer of incoming calls to a wireless device according to claim 4, wherein:
said key is unique to one of a plurality of frequent occupants of said vehicle.

6. The apparatus to establish transfer of incoming calls to a wireless device according to claim 5, wherein:
said plurality of frequent occupants is two, such that said key detects a presence of either of two frequent occupants of said vehicle.

7. The apparatus to establish transfer of incoming calls to a wireless device according to claim 1, further comprising:
a short range radio frequency communication module in said vehicle to detect a presence of an occupant within said vehicle when said wireless device associated with said occupant communicates with said short range radio frequency communication module.

8. The apparatus to establish transfer of incoming calls to a wireless device according to claim 7, wherein:
said short range radio frequency communication module is a piconet communication module.

9. A method of automatically forcing establishment of a call transfer in a wireless network to a wireless device, comprising:
detecting activation of a vehicle ignition; and
triggering initiation without user confirmation from a given wireless device within said vehicle that is not linked with an in-vehicle telematics unit, when said vehicle ignition activation is detected, of a wireless message for communication from said in-vehicle telematics unit to a telematics center, said wireless message requesting said telematics center to initiate call forwarding of all future calls intended for said wireless device within said vehicle instead be forwarded to said in-vehicle telematics unit;
wherein said wireless message is transmitted to said telematics center by said in-vehicle telematics unit of said vehicle; and
whereby said wireless device does not control said initiation of said call forwarding.

10. The method of establishing a call transfer in a wireless network to a wireless device according to claim 9, further comprising:
performing a lookup of at least one phone number to be call forwarded when said occupant is detected present in said vehicle.

11. The method of establishing a call transfer in a wireless network to a wireless device according to claim 10, wherein:
said lookup is performed by a third party database service.

12. The method of establishing a call transfer in a wireless network to a wireless device according to claim 10, wherein:
results of said lookup are transmitted via a signaling system No. 7 (SS7) protocol.

13. The method of establishing a call transfer in a wireless network to a wireless device according to claim 10, wherein:
results of said lookup are transmitted via an Internet Protocol (IP).

14. The method of establishing a call transfer in a wireless network to a wireless device according to claim 13, wherein:
results of said lookup are transmitted via a Session Initiation Protocol (SIP).

15. The method of establishing a call transfer in a wireless network to a wireless device according to claim 9, further comprising:
detecting an operating condition of said vehicle.

16. The method of establishing a call transfer in a wireless network to a wireless device according to claim 15, further comprising:
ending said established call transfer upon detection of said vehicle no longer being in said operating condition.

17. The method of establishing a call transfer in a wireless network to a wireless device according to claim 9, wherein:
said presence of said occupant is detected by an ignition to said vehicle.

18. The method of establishing a call transfer in a wireless network to a wireless device according to claim 17, wherein:
said ignition detects a presence of a key associated with said occupant inserted in said ignition.

19. The method of establishing a call transfer in a wireless network to a wireless device according to claim 9, further comprising:
ending said established call transfer upon detection of said occupant not being present in said vehicle.

20. The method of establishing a call transfer in a wireless network to a wireless device according to claim 9, wherein:
said wireless device is a cell phone.

21. The method of establishing a call transfer in a wireless network to a wireless device according to claim 9, wherein:
said telematics unit is mounted in said vehicle at a time of manufacture of said vehicle.

* * * * *